Nov. 14, 1950  L. G. DUFILHO  2,529,764
MAGNETIC COMPASS
Filed Oct. 27, 1947
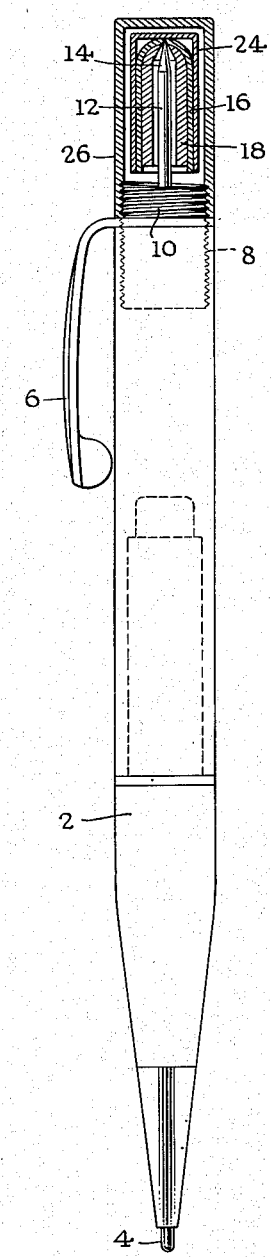
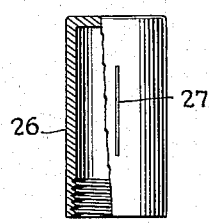
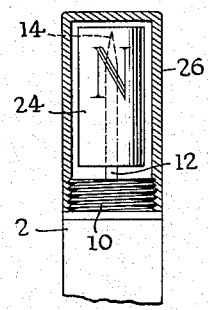
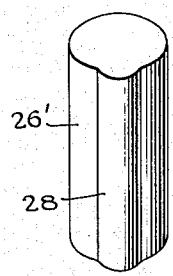
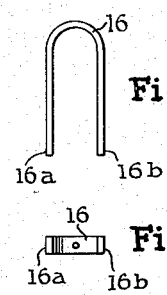
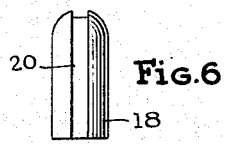
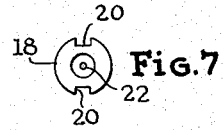
INVENTOR,
Leon G. Dufilho,
BY Fisher & Christen, ATTORNEYS.

Patented Nov. 14, 1950

2,529,764

UNITED STATES PATENT OFFICE 2,529,764

MAGNETIC COMPASS

Leon G. Dufilho, Shreveport, La.

Application October 27, 1947, Serial No. 782,297

5 Claims. (Cl. 33—222)

This invention is a combined pen or pencil, and a magnetic compass.

Heretofore, a compass has been combined with a pen or pencil, but the presence of the compass usually renders the article somewhat bulky at the compass end.

An important object of the present invention is to provide a compass for a pen or pencil wherein a compass of satisfactory accuracy is provided and where the overall diameter of the compass is about the same as the diameter of the pen or pencil.

Another object of the invention is to provide a compass magnet and mounting therefor, this magnet being substantially in the shape of an inverted U. The magnet is pivoted on a vertical axis for free rotation.

Another object of the invention is to provide a compass for a pen or pencil in which certain of the parts are made of a plastic material, preferably of transparent plastic.

According to the present invention, the compass magnet is of inverted U-shape and is carried by a plastic shell which is supported for free rotation on the point of a spindle carried by a plug at the end of the pencil.

The compass card, provided with the usual indicia, moves with the compass magnet, and a cap of transparent material fits over the compass card. Evidently, however, the usual compass indicia could be on the fixed outer plastic cap, if desired.

The general features of the invention having been thus outlined, reference is now made to the accompanying drawings, illustrating the invention in greater detail, in which Fig. 1 is a side view, partly in section, of my improved pen or pencil combined with a compass;

Fig. 2 is a side view, partly in section, of the exterior cap;

Fig. 3 is a side view in part of the compass card;

Figs. 4 and 5 are side and bottom views of the compass magnet;

Figs. 6 and 7 are side bottom views of the carrier for the compass magnet;

Fig. 8 is a side view, partly in section, of the compass in position at the end of the pencil or pen; and Fig. 9 is a perspective view of a modification.

Referring now to these drawings, 2 is the body of a pen or pencil, preferably cylindrical in shape. It is provided with the usual writing point 4 and pocket clip 6. One end of the body 2 is interiorly threaded as at 8 and carries a plastic plug 10, exteriorly threaded and preferably cemented in place. Plug 10 is provided with a metallic spindle 12 having the usual pointed end 14. The compass magnet 16 is in the shape of an inverted U and is made of a suitable iron or steel alloy that can be magnetized and will hold its magnetism permanently. A known alloy for this purpose, in addition to the iron content, contains aluminum, nickel and cobalt, and is commonly known as Alnico. Magnet 16 is preferably in the form of a flattened strip, as shown in Fig. 5. It could be round, if desired.

One tip such as 16a, for example, of the magnet would be the north pole, while 16b of the magnet would be the south pole. The compass magnet 16 is carried by a plastic carrier 18, generally cylindrical, the lower end of which is open and upper end of which is closed and rounded as shown in Fig. 6. This carrier 18 is provided with an exterior groove 20 of the same size as the compass magnet, so that the magnet fits into the groove, in which it can be cemented if desired, leaving the exterior surface cylindrical. A small hole 22 is drilled in the inside top of the carrier to receive the point 14 of the spindle 12. The lateral or horizontal dimensions of the magnet 16 and carrier 18 may be about the same as the diameter of body 2 or, as shown, a little less than such diameter.

The compass card 24 is in the shape of a cylindrical cap, made of transparent plastic and is closed at its upper end, and open at its lower end. This may be provided with the usual NSEW markings. This card 24 fits snugly over magnet 16 and its carrier 18, and moves with the magnet assembly. The assembly of magnet, carrier and card is freely rotatable on the point 14 of the spindle.

A protecting cap 26, made of transparent plastic material, is threaded in place on the upper end of the body 2, the cap being cylindrical, closed at its upper end and interiorly threaded at its lower end to engage with suitable threads, such as the exterior threads on the exterior threaded plug 10. This cap is provided with the usual index or lubber line 27. The diameter of cap 26 is about the same as the diameter of body portion 2. As shown in the modification, Fig. 9, cap 26, may be provided with a convex magnifying lens 28, made of plastic material having the necessary optical properties.

It should be understood that instead of a movable compass card 24 carrying the usual graduations, vertical NSEW reference lines could be provided on the transparent cap 26, as is well understood in this art.

By virtue of the described construction the entire compass assembly has an exterior diameter substantially that of the body 2.

Since the invention is equally applicable to a pen or pencil it should be understood that these terms are used interchangeably in the specification and claims.

The body of the article, instead of being a pen or pencil, could instead be simply a cylindrical body, in which case the article would serve as a pocket compass.

While the preferred embodiment of the invention has been illustrated in some detail, it should be understood that the invention is not limited to these precise details, but may be carried out in other ways.

I claim as my invention:

1. A pocket compass, comprising a relatively long cylindrical body portion, a spindle for a compass magnet projecting axially from one end of said body portion, a hollow carrier open at its bottom and having an inverted U-shaped groove therein, a compass magnet in the shape of an inverted U fitted in the groove of said carrier, said carrier and said cap being cooperatively freely pivoted on said spindle, and a protecting transparent cap carried by the end of said body portion, and surrounding and enclosing said compass magnet, the outside diameter of said protecting transparent cap being approximately the same as the outside diameter of said body portion.

2. A pocket compass, comprising a body portion of approximately the dimensions of a pen or pencil, a spindle for a compass magnet projecting axially from one end of said body portion, a substantially cylindrical hollow carrier, open at the bottom and having an inverted U-shaped groove therein, a compass magnet in the shape of an inverted U, fitted in the groove of said carrier, a cap having indicia thereon fitted closely over said carrier and magnet and movable therewith, the assembly of said carrier, magnet and cap being freely pivoted on said spindle, and a transparent cap, secured to said body portion and enclosing said freely pivoted assembly, the outside diameter of said enclosing transparent cap being approximately the same as the diameter of said body portion.

3. The combination as claimed in claim 1, wherein the transparent cap is provided with a magnifying lens, extending longitudinally thereof, with its axis substantially parallel to said spindle.

4. A pocket compass, comprising a relatively long cylindrical body portion, a spindle for a compass magnet projecting axially from one end of said body portion, a compass magnet in the shape of an inverted U, freely pivoted on said spindle, a cap fitted over the compass magnet and movable therewith, a second cap extending over the compass magnet and its cap and spaced therefrom, said first-mentioned cap being provided with the usual compass markings, the diameter of said outer cap being approximately the same as the diameter of said cylindrical body portion.

5. The combination as claimed in claim 2, wherein the transparent cap is provided with a magnifying portion extending longitudinally thereof, substantially parallel to said spindle.

LEON G. DUFILHO.

REFERENCES CITED

The following references are of record in the file of this patent:

UNITED STATES PATENTS

| Number | Name | Date |
|---|---|---|
| 1,474,394 | Warburg | Nov. 20, 1923 |
| 2,127,878 | Martin | Aug. 23, 1938 |

FOREIGN PATENTS

| Number | Country | Date |
|---|---|---|
| 394,874 | Germany | May 12, 1924 |
| 532,973 | Great Britain | Feb. 4, 1941 |